Nov. 26, 1968    E. LANDBERG    3,412,448
METHOD AND APPARATUS FOR MANUFACTURING SHEET
METAL CENTRAL HEATING RADIATORS
Filed Nov. 19, 1965    6 Sheets-Sheet 1
FIG. 1.
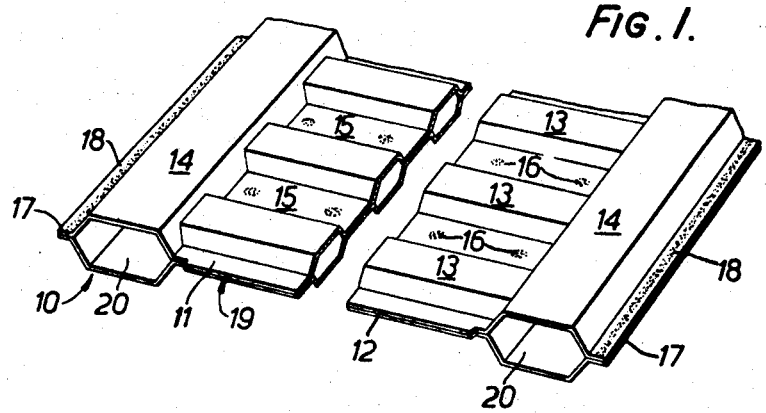
FIG. 2.
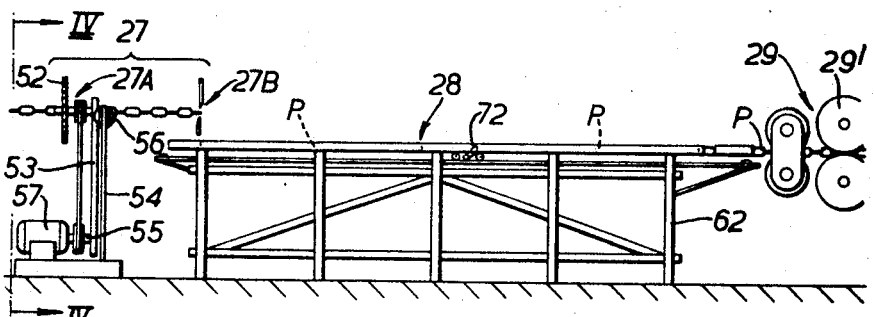
FIG. 3.
INVENTOR
ERIK LANDBERG
BY *Stephen H. Frishauf*
ATTORNEY

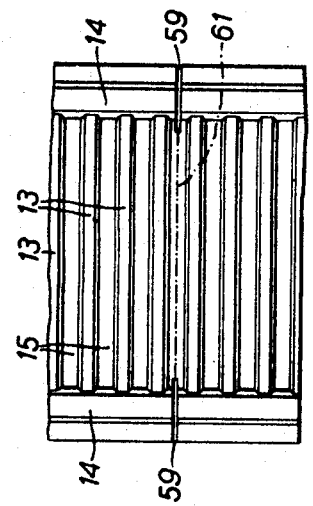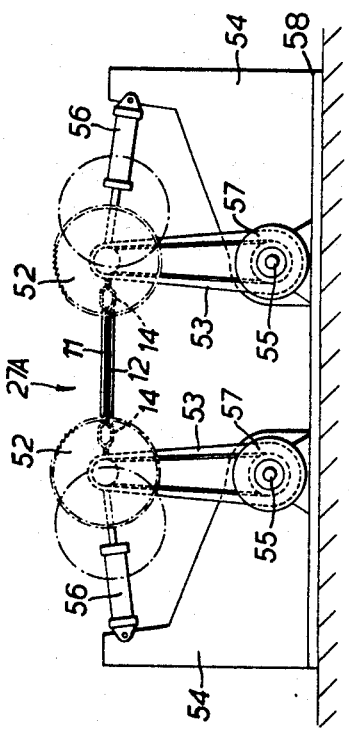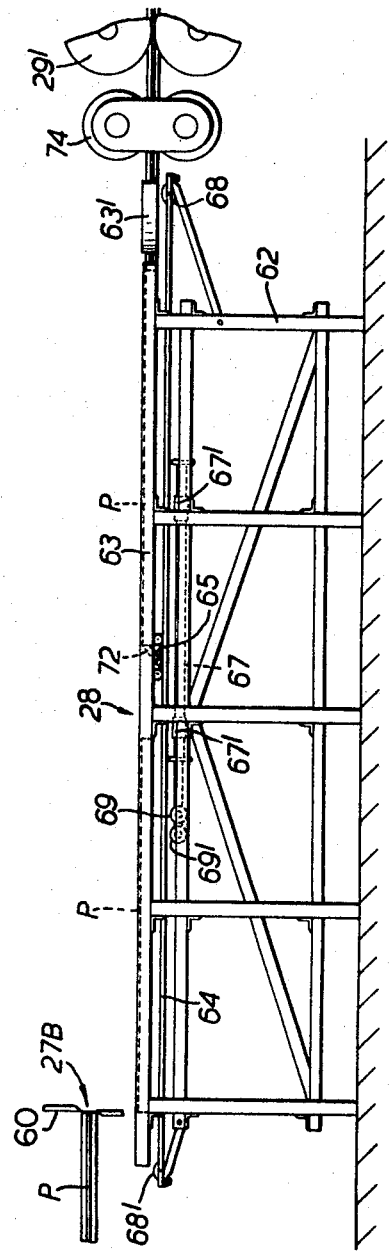

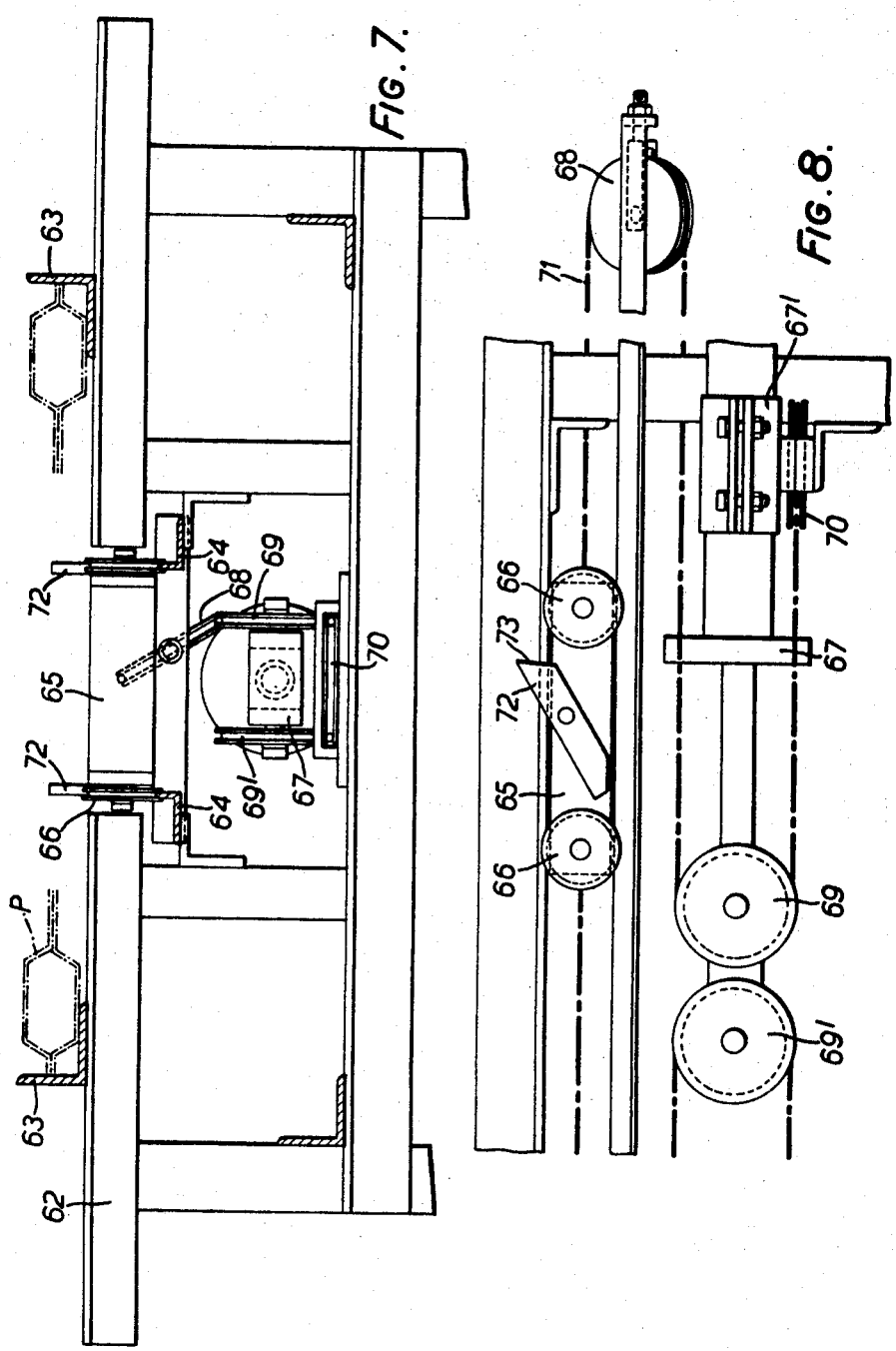

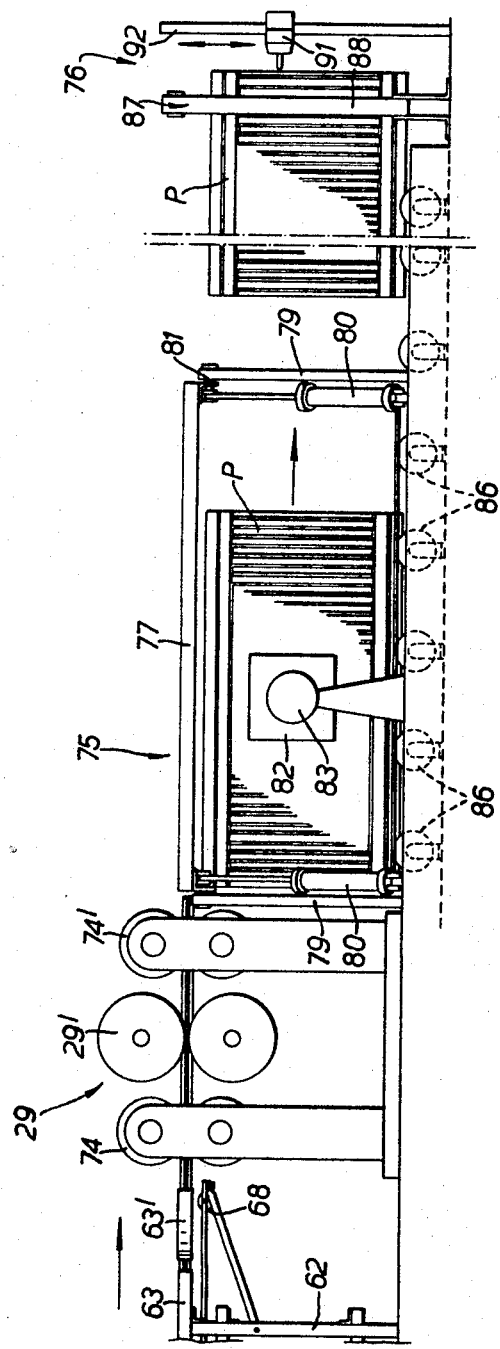

Nov. 26, 1968   E. LANDBERG   3,412,448
METHOD AND APPARATUS FOR MANUFACTURING SHEET
METAL CENTRAL HEATING RADIATORS
Filed Nov. 19, 1965   6 Sheets-Sheet 5

INVENTOR
ERIK LANDBERG
BY
ATTORNEY

Nov. 26, 1968   E. LANDBERG   3,412,448
METHOD AND APPARATUS FOR MANUFACTURING SHEET
METAL CENTRAL HEATING RADIATORS
Filed Nov. 19, 1965   6 Sheets-Sheet 6

INVENTOR
ERIK LANDBERG
BY
ATTORNEY

United States Patent Office 3,412,448
Patented Nov. 26, 1968

3,412,448
METHOD AND APPARATUS FOR MANUFACTURING SHEET METAL CENTRAL HEATING RADIATORS
Erik Landberg, Monte Carlo, Monaco, assignor to Polyventions Limited, Valetta, Malta, a Maltese company
Filed Nov. 19, 1965, Ser. No. 508,869
Claims priority, application Great Britain, Nov. 27, 1964, 48,273/64
10 Claims. (Cl. 29—157.3)

ABSTRACT OF THE DISCLOSURE

In manufacturing central heating radiator panels, a pair of confronting sheet metal strips are fed intermittently through a press with a reciprocating press action to form appropriate grooves which when the strips are brought together face to face constitute inter alia conduits extending lengthwise one along each margin of the strips, the pressed strips being tack welded thus together. To sever the welded strips transversely to form panels, each margin including its conduit section is cut through using high speed rotary cutter means at one station, the remaining central portion between the margins is sheared through at another station, and such marginal cutting and shearing are effected during appropriate normal dwell periods of the intermittent strip feed.

---

Figure 10:
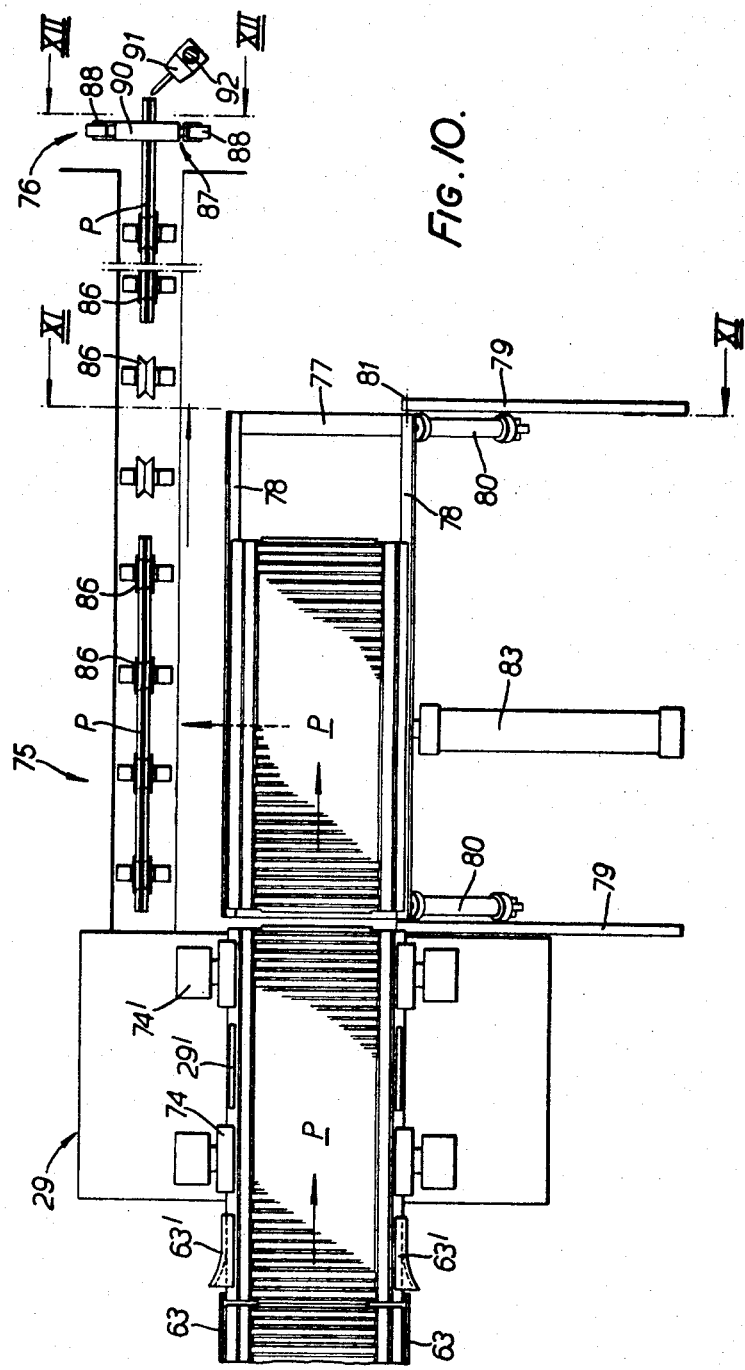

The invention concerns improvements relating to methods and apparatus for manufacturing heating radiator panels substantially continuously from confronting sheet metal strips, such radiator panels being used for example in central heating installations.

Such processes are known wherein the strips are fed along the production line substantially continuously, but a problem arises in that some form of transverse cutting operation has to be effected to sever the pressed and spot welded panels in succession from the strips, and due to the time taken by the known cutting operations the minimum length of the panels cannot be sufficiently short for all desired cases. The relatively long time involved is because the transverse cut includes two marginal conduit sections of each panel form which must not be crushed or otherwise disfigured by the operation.

One known method uses a high speed rotary cutter disc traversing the strips and travelling with the strips to avoid any extra dwell time of the strips, apart from that required for the almost instantaneous pressing and spot welding, but the actual cutting time and therefore the minimum panel length is still excessive for some cases. This transverse cutting time also depends on the width of the strips. In practice, for strip and panel widths of 40 in., 30 in. or 20 in. respectively this cutting time is equivalent to the passage along the production line of a minimum panel length of 16 in., 11.2 in. or 8 in. respectively.

Objects of the invention are to overcome such problems in substantially continuous automatic production of the panels, and also to avoid the need for the cutter means to travel with the strips along the production line.

According to the invention there is provided a method of manufacturing heating radiator panels from sheet metal which comprises feeding a pair of confronting sheet metal strips intermittently through a reciprocating press separately to form in each strip grooves which when the strips are placed together constitute flow ducts extending transversely of the strips and conduits interconnecting the ducts and extending lengthwise one along each margin of the strips, bringing the strips together face to face so that the grooves are superposed to constitute the ducts and conduits, welding the pressed strips together face to face, severing the welded strips transversely between ducts to form panels of predetermined length during appropriate dwell periods of the intermittent feed by cutting through each margin including the respective conduit section using high speed cutter means and by shearing through the central portion between such margins, thence conveying the panels in succession to seam weld together the lengthwise edges of each panel in a single continuous operation, and welding together the transverse edges of each panel.

Apparatus for carrying out such method comprises a reciprocating press to form the grooves in each strip which are mirror images one of another, a feed mechanism downstream of the press to advance the strips intermittently and bring the pressed strips together face to face so that the mirror images of the grooves are superposed to form the flow ducts and conduits, a spot welder to weld such strips together, means to sever the welded strips transversely between the ducts to form panels comprising high speed cutter means arranged at each side of the strips to cut through each margin of the strips including the respective conduit section and a shearer arranged to cut through the central portion of the strips between such margins, a seam welder to weld together the lengthwise edges of each panel in a single continuous operation, means to convey the panels in succession from the severing means to the seam welder, and means to weld together the transverse edges of each panel.

Figure 11:
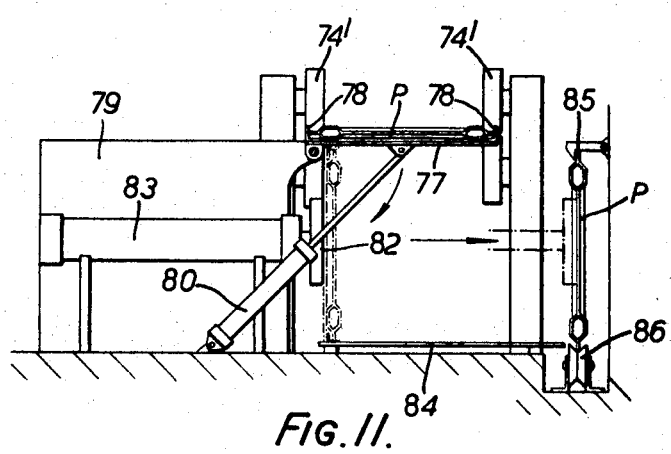
Figure 12:
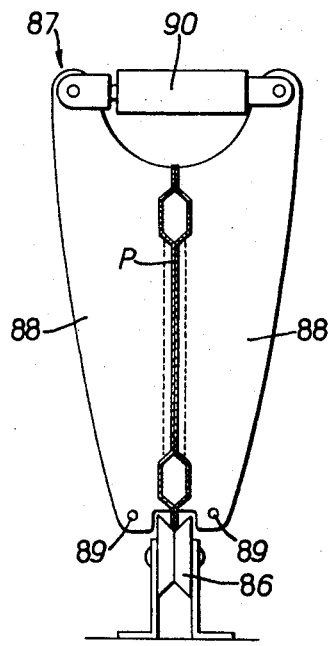

An embodiment of the invention is hereinafter described by way of example only with reference to the accompanying drawings wherein:

FIG. 1 is a perspective view of part of a radiator panel produced according to the invention, FIG. 2 is a diagrammatic side elevation of initial stages of the production line including press, feed mechanism and spot welder, FIG. 3 shows the later stages of the line including a marginal cutter station, shear station, conveyor and longitudinal seam welder, FIG. 4 is an enlarged transverse sectional view on the line IV—IV of FIG. 3 at the marginal cutter station, FIG. 5 is a plan view of a length of the strips illustrating the transverse sever line, FIG. 6 is an enlarged elevation of the conveyor to the seam welder, FIG. 7 is an enlarged transverse sectional view of such conveyor, FIG. 8 illustrates the pusher mechanism with ram actuation by way of a pulley and cord arrangement, FIG. 9 is a diagrammatic side elevation of further means for conveying the panels from the longitudinal seam welder to a transverse edge welder, FIG. 10 is a plan view of such means, FIG. 11 is an enlarged transverse sectional view of the line XI—XI of FIG. 10, and FIG. 12 is an enlarged transverse sectional view on the line XIII—XIII of FIG. 10.

The invention is concerned with substantially continuous manufacture of sheet metal central heating radiator panels 10 such as shown in FIG. 1. Each panel comprises a pair of sheet metal strips 11, 12, formed with grooves which constitute spaced parallel water-flow ducts 13 and two conduits 14 interconnecting the ducts and extending lengthwise one along each margin of the panel. The strip portions 15 between the ducts 13 engage face to face and are spot welded together as at 16. The longitudinal edges 17 are seam welded together at 18, and the transversely cut edges 19 are also welded, to provide fluid tight seams. Connectors and closure plates are subsequently received within the open ends 20 of conduits 14 for connecting the panel to the pipes of a central heating installation.

In manufacture as illustrated in FIGS. 2 and 3, the strips 11, 12 are fed from rolls 21, 22 supported on a stand 23 and pass face to face through a reciprocating press 24, a feed mechanism 25 for advancing the strips, a spot welder 26, panel severing means 27, a conveyor 28 for the severed panels, and a seam welder 29, in succession along the production line.

The strips 11, 12, are looped upwards between the supply rolls 21, 22 and the press to allow some slack for the intermittent feed through the reciprocating press and along the production line, the rolls 21, 22 being driven by electric motor means M1 intermittently as controlled by a microswitch S1 which senses the condition of the loop to maintain the appropriate slack. The rolls 21, 22 may have friction brake means to prevent unintentional uncoiling of the strips due to spring effects.

The press 24 comprises a foundation 30 which supports, by pillars 33, a carrier 31 for a hydraulic ram 32. The ram has a cylinder 34 connectable to a source of pressure liquid by pipes 35, 36. The piston rod 37 supports a punch block 38 which is guided for vertical movement by pillars 33. Block 38 removably carries a punch. A die block 39 is secured, so that it does not move, to foundation 30. The upper face of block 39 receives a die which is removable and replaceable from the block. A member 40 is mounted on pillars 33 for vertical movement and is urged upwardly away from block 39 by springs 41. When the rod 37 is in its uppermost position the block 38 is spaced from member 40 and the latter is spaced from block 39. This is shown in FIG. 2. Removably secured to the upper face of member 40 is a die and similarly a removable punch is secured to he lower face of member 40.

This strip 11 passes between blocks 38, 40 and strip 12 passes between blocks 39, 40. When block 38 is forced down by ram 32 it engages member 40—through strip 11—and forces member 40 downwardly against the action of springs 41 and against block 39—strip 12 being therebetween. The punch and die of blocks 38, 40 form strip 11 with a number of ducts 13 and the corresponding length of conduits 14. At the same time the punch and die of blocks 40, 39 form strip 12 with ducts 13 and conduits 14 in similar manner.

Having press formed a number of ducts as described in a single down stroke of the press the ram 32 is actuated to raise block 38 to release strips 11, 12. When the press is open the feed mechanism 25 is actuated.

In practice the mechanism 25 is immediately next to press 24 and is carried by the frame of the press. Mechanism 25 comprises a pair of pusher bars 42 each connected to a piston rod 43 of a hydraulic ram 44. The latter is supplied by pressure liquid through pipes 45, 46. When pressure liquid is supplied to rams 44 through pipes 45 pusher bars 42 are moved towards strips 11, 12 and also in a forward direction away from press 24. Each bar 42 is shaped to receive a duct 13. Thus bars 42 grip the strips through the agency of ducts 13. The stroke of rams 44 and their disposition is such that when actuated as indicated the strips 11, 12 are advanced by the pitch of ducts 13. Consequently a fresh length of the strips is drawn into the press and the punches and dies act thereon and also, once more, on the previously form-pressed strips having ducts immediately next to the fresh length. In this way the strips may be pressed several times in succession so that the ducts and conduits may be shaped to a greater extent in a series of steps. In any event the ducts and conduits are accurately and uniformly produced. Mechanism 25 is actuated intermittently to bring the strips together face to face and feed the strips forward each time press 24 is opened. Bars 42 are retracted while press 24 is in operation shaping the strips. The strips, as shown, are face to face with the half portions of ducts 13 and conduits 14 accurately superposed. The strips 11, 12 so positioned pass to the spot welder 26.

Welder 26 comprises a row of pressure cylinders 47 each carrying a welding electrode 48 to co-act with a block 49 in known manner. The row of electrodes 48 is placed to be above a portion 15 and since mechanism 25 advances the two strips 11, 12 together by the pitch of ducts 13, successive portions 15 are brought beneath the row of electrodes. The cylinders 47 are operated to weld the portions 15 of strips 11, 12 together while the press 24 is closed. When the press opens, cylinders 47 at the same time raise electrodes 48 so that the welded strips may be advanced by mechanism 25. Cylinders 47 are connected to a source of pressure fluid by pipes 50, 51.

After leaving welder 26 the strips 11, 12 are united and lengths of the strips representing panels of required size can be severed from the united strips. Each panel has a length which is a multiple of the pitch of ducts 13, the transverse edges of the panel extending centrally along portions 15.

The severing means 27 comprises a station 27A with high speed cutter means arranged at each side of the strips and acting simultaneously to cut through each margin of the strips including the respective conduit section 14, and spaced along the feed line therefrom a station 27B with a shearer arranged to cut through the central portion of the strips between such margins.

As illustrated in FIG. 4, each marginal cutter means at station 27A comprises a high speed rotary cutter disc 52 carried by an arm 53 mounted on a frame 54 for rocking movement about a pivot axis 55 parallel with the feed line, and a fluid-operated double acting ram 56 actuated rapidly to effect the marginal cutting feed and then withdraw the cutter during a single dwell period of the intermittent strip feed. Each cutter disc is suitably driven, e.g., from an electric motor 57. The two frames 54 may be adjustably secured to a base 58 to accommodate different widths of strip. This marginal cutting operation is effected automatically when a sufficient length of the spot welded strips has been fed past the station 27A corresponding to a desired panel length. For example, the feed mechanism 25 may operate an electronic counter device to effect the cutting operation after an appropriate predetermined number of feed strokes. The nature of the marginal cuts is seen in FIG. 5 at 59.

At station 27B the shearer 60 is actuated to shear at a single stroke through the central portion of the strips, i.e., along the line 61 between the marginal cuts 59. The shear blades may be replaceable to accommodate different widths of strip. The shearer also acts during a single dwell period of the intermittent strip feed, and is automatically actuated a predetermined period after the marginal cutting operation when the severance line 59, 61 will have been fed the distance from station 27A to station 27B.

The marginal cutting operation ensures that the conduit sections 14 are not crushed as would occur by shearing across the whole strip width, whilst no extra dwell time is needed to effect the separate and rapid marginal cutting and central shear operations. Thus the severance time does not involve any substantial minimum panel length, e.g., even single duct panels could be cut if required.

As a panel P is severed from the strips it is arranged to drop on to the conveyor 28 shown in more detail in FIGS. 6 to 8. The conveyor comprises a frame 62 presenting parallel spaced L-section panel guide rails 63 adjustable to accommodate the strip width, and carriage guide rails 64 mounting a carriage 65 by way of wheels 66. The carriage is reciprocable along the length of the conveyor as a pusher means by an air pressure operated double acting ram 67 secured to the frame by clamps 67' and acting through an arrangement of pulleys 68, 69, 70 and cord 71. The cord is secured in endless fashion to the carriage and extends around the front pulley 68 on the frame, back around the front pulley 69 mounted on the ram 67, thence around the lower forward frame pulley 70, and back along the length of the conveyor and around a similar system, including pulleys 68', 69' for the rear of the frame, and so back to the carriage. The arrangement is such that a rearward relatively short stroke of the ram 67 applies a forward relatively long stroke to the carriage, such magnified, in fact doubled, carriage stroke being of correspondingly higher velocity. The ram 67 may have flow restrictors to adjust the velocities of the forward and return strokes. The carriage pivotally mounts two catch members 72 one at each side of the carriage, each member 72 normally tipping to a limit position to present a panel engaging edge 73 in the panel feed path, as in FIGS. 7 and 8. The catch members positively engage the trailing transverse edge of each panel during a forward stroke of the carriage and automatically retract out of the path of the following panel during the return stroke of the carriage to tip into raised position for engagement with the trailing edge of such following panel.

The ram actuates such pusher means to push a panel along the conveyor and, by way of further guide rails 63' presenting flared ends to receive the panels properly, into the nip of two pairs of driven rolls 74 of the longitudinal edge seam welder 29, having welding discs 29' driven with the rolls 74 to operate only when required. The ram valves are controlled by microswitches so that the ram maintains pressure on a panel being fed to the welder 29 until a following severed panel drops onto the conveyor and triggers a microswitch so that the carriage is automatically returned to a rearward limit position to catch against the trailing edge of such panel. In the rear limit position the carriage triggers another microswitch to initiate the forward stroke of the carriage, so that the carriage pushes this following panel to abut against the preceding panel feeding through the welder. The conveyor is made of such length that even the longest desired length of panel can be accommodated, whilst always leaving space for the panels to drop on to the conveyor as they are severed due to the immediate advance of the severed panels by the pusher means. The welder 29 seam welds the longitudinal edges 17 of each panel in a single continuous operation.

FIGS. 9 to 12 illustrate conveyor means 75 for advancing the panels from the welder 29 to a transverse edge weld station 76. The conveyor means 75 comprises a table 77 of open rectangular form presenting parallel spaced side members 78 of L-section adjustable to accommodate the appropriate panel width. The table length is sufficient to accommodate the longest required panel. The table receives each panel in succession from driven roll pairs 74' of the welded 29 whilst in a horizontal position, and is tiltable on its support 79 by rams 80 about a pivot axis 81 parallel with the feed line to swing down into a vertical position where an electromagnetic head 82 of a ram 83 co-acts with the respective side of the panel to maintain the vertical attitude of the panel whilst the ram 83 is actuated through the table to displace the panel sideways out of the swing path of the table. The panel is displaced across a floor surface 84 until its upper edge becomes engaged by a latch means 85 and its lower edge rests on a line of guide rolls 86. The ram 83 is then retracted, and the table swung back to the horizontal position by the rams 80 to receive the next panel. Each panel is subsequently advanced along the guide rolls 86 with suitable guides maintaining its vertical attitude. If desired, the latch means 85 can act to retain a plurality of panels stacked vertically, a following one against the preceding one, by the ram 83 so that each actuation of the ram brings an outermost panel to rest on the line of guide rolls 86.

At the transverse edge weld station 76 there is located a clamp 87 comprising suitably profiled jaws 88 pivotally located at their base at 89 and actuated by a powerful hydraulic double acting ram 90 to hold the leading end of the panel transversely and eliminate any transverse warp of the panel whilst an automatic welder head 91 traverses the respective transverse edge 19 of the panel, the head being reciprocated along a mounting column 92. The welder may be of the electric short arc-inert gas type. A similar welder and clamp arrangement can be located to operate simultaneously at the trailing end of the panel.

Alternatively such operation on the trailing end could be effected at a subsequent weld station.

The whole process of production is suitably controlled to operate substantially continuously and automatically.

It will be noted from FIG. 5 that the marginal cutting operation removes some material at the cuts whereas the shear operation does not, so that in the panels produced the transverse edges 19 project very slightly beyond the conduit ends 20. However, in the fittting of connectors or closure plates as above mentioned this difference is in effect eliminated.

A typical production run may have a strip feed cycle of 0.3 sec. feed time alternating with 1.2 secs. dwell time up to the severing operation. The overall rate of the strip feed may be for example about 5 ft./min.

I claim:

1. A method of manufacturing heating radiation panels from sheet metal which comprises feeding a pair of confronting sheet metal strips intermittently through a press which has a reciprocating press action normal to the strips to form grooves which when the strips are placed together constitute flow ducts extending transversely of the strips and conduits interconnecting the ducts and extending lengthwise one along each margin of the strips, bringing the strips together face to face so that the grooves constitute the ducts and conduits, welding the pressed strips together face to face, severing the welded strips transversely between ducts to form panels of predetermined length by cutting at high speed through each margin including the respective conduit section using high speed rotary cutter means at one station, by shearing through the central portion between such margins at another station spaced along the feed line from the marginal cutting station, and effecting such marginal cutting and shearing during appropriate normal dwell periods of the intermittent strip feed, thence conveying the panels in succession to seam weld together the lengthwise edges of each panel in a single continuous operation, and welding together the transverse edges of each panel.

2. A method according to claim 1 wherein the cut panels are conveyed to the seam welder using a reciprocating pusher means actuated by air pressure operated ram means to positively feed the panels by such air pressure to the welder and acting on each panel in turn after the transverse severance from the strips to maintain the feed pressure on the panels.

3. A method according to claim 1 wherein the panels pass in succession from the longitudinal seam welder in a horizontal plane onto a tilting table and are thereby swung into a vertical attitude and subsequently displaced in said attitude out of the swing path of the table and thence delivered in said attitude to a further weld station at which a transverse edge of each panel is welded automatically.

4. Apparatus to manufacture central heating radiator panels from strips of material comprising a reciprocating press to form grooves in the strips; a feed mechanism downstream of the press to advance the strips intermittently and bring the grooved strips together face to face so that the grooves form flow ducts and conduits; a spot welder to weld such strips together; means to sever the welded strips transversely between the ducts to form panels, said severing means including high speed rotary cutter means arranged at one station at each side of the strips to cut through each margin of the strips including the respective conduit section and a shearer arranged at another station spaced along the feed line from the marginal cutting station to cut through the central portion of the strips between such margins, the marginal cutter means and the central shearer being operable during appropriate normal dwell periods of the intermittent strip feed; a seam welded to weld together the lengthwise edges of each panel in a single continuous operation; means to convey the panels in succession from the severing means to the seam welder; and means to weld together the transverse edges of each panel.

5. Apparatus according to claim 4 wherein each marginal cutter means comprises a rotary cutter disc carried by an arm mounted for rocking movement about a pivot axis parallel with the feed line, and means actuating the arm rapidly to effect the marginal cutting feed and then withdraw the cutter during a single dwell period of the intermittent strip feed.

6. Apparatus according to claim 5 wherein the actuating means includes a fluid-operated doubleacting ram.

7. Apparatus according to claim 4 wherein the means to convey the panels from the severing means to the seam welder comprises a pusher means reciprocable by air pressure operated ram means to positively engage the trailing transverse edge of each panel in turn after the transverse severance from the strips and feed the panels by such air pressure to the welder and maintain the feed pressure on the panels.

8. Apparatus according to claim 7 wherein the pusher means comprises a reciprocating carriage mounting catch means to engage the trailing edge of a panel during a forward stroke of the carriage and to automatically retract out of the path of the following panel during a return stroke of the carriage to bring the catch means to engage the trailing edge of such following panel.

9. Apparatus according to claim 4 wherein the means to weld together the transverse edges of each panel are located downstream of the longitudinal seam welder at a further weld sttaion, and a further conveyor means between the longitudinal seam welder and the transverse edge weld station comprises a table with an open form and tiltable about a pivot axis parallel with the feed line between a horizontal position in which it receives each panel from the longitudinal seam welder and a vertical position where a ram means is actuable through the table to displace the panel whilst in such vertical attitude out of the swing path of the table for delivery in said attitude to the transverse edge weld station.

10. Apparatus according to claim 9 wherein said ram means includes an electromagnetic head which co-acts with one side of the panel in vertical attitude to maintain such attitude whilst displacing the panel out of the table path.

References Cited

UNITED STATES PATENTS

| 3,089,448 | 5/1963 | Tribe | 29—208 X |
| 3,119,296 | 1/1964 | Foster | 83—54 |
| 3,210,834 | 10/1965 | Orr et al. | 29—208 |
| 3,291,321 | 12/1966 | Hamilton | 29—208 X |

FOREIGN PATENTS

| 932,324 | 7/1963 | Great Britain. |

JOHN F. CAMPBELL, *Primary Examiner.*

D. C. REILEY, *Assistant Examiner.*